United States Patent
Ishijima et al.

(10) Patent No.: US 9,828,028 B2
(45) Date of Patent: *Nov. 28, 2017

(54) PARKING ASSIST DEVICE

(71) Applicant: TOYOTA JIDOSHA KABUSHIKI KAISHA, Toyota-shi, Aichi-ken (JP)

(72) Inventors: Hironobu Ishijima, Miyoshi (JP); Eriko Yamazaki, Toyota (JP); Keisuke Oyama, Toyota (JP); Hisashi Satonaka, Susono (JP); Hidehiko Miyoshi, Kariya (JP); Keisuke Hata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,015

(22) PCT Filed: Jun. 5, 2013

(86) PCT No.: PCT/JP2013/065619
§ 371 (c)(1),
(2) Date: Dec. 1, 2015

(87) PCT Pub. No.: WO2014/196040
PCT Pub. Date: Dec. 11, 2014

(65) Prior Publication Data
US 2016/0101813 A1    Apr. 14, 2016

(51) Int. Cl.
*B60W 30/06* (2006.01)
*B62D 6/00* (2006.01)
(Continued)

(52) U.S. Cl.
CPC ......... *B62D 15/0285* (2013.01); *B60W 30/06* (2013.01); *B62D 5/04* (2013.01); *B62D 5/0496* (2013.01); *B62D 6/00* (2013.01)

(58) Field of Classification Search
CPC . B60W 30/06; B62D 15/0285; B62D 5/0481; B62D 5/0496
See application file for complete search history.

(56) References Cited

U.S. PATENT DOCUMENTS

| | | | |
|---|---|---|---|
| 2013/0043989 A1 | 2/2013 | Niemz | |
| 2014/0129091 A1* | 5/2014 | Yamazaki | B62D 5/0496 701/42 |
| 2016/0185389 A1* | 6/2016 | Ishijima | B62D 15/0285 701/41 |

FOREIGN PATENT DOCUMENTS

| | | |
|---|---|---|
| CN | 103930334 A | 7/2014 |
| EP | 2 921 375 A1 | 9/2015 |

(Continued)

OTHER PUBLICATIONS

Office Action issued in U.S. Appl. No. 14/392,177 on Dec. 1, 2016.
(Continued)

*Primary Examiner* — Thomas Ingram
(74) *Attorney, Agent, or Firm* — Finnegan, Henderson, Farabow, Garrett & Dunner, LLP

(57) ABSTRACT

When starting automatic pulling-in control, an electronic control unit calculates a temperature increase amount $\Delta Ti$ of a motor caused by the execution of the automatic pulling-in control and a temperature increase amount $\Delta To$ of the motor caused by the execution of automatic pulling-out control. Based on the current temperature of the motor, the temperature increase amount $\Delta Ti$, and the temperature increase amount $\Delta To$, the electronic control unit obtains a predicted temperature of the motor of a case in which the automatic pulling-out control is executed subsequent to the automatic pulling-in control. When the predicted temperature is lower than an allowable upper limit, starting of the automatic pulling-in control is permitted. When the predicted tempera- (Continued)

ture is higher than or equal to the allowable upper limit, starting of the automatic pulling-in control is prohibited.

7 Claims, 8 Drawing Sheets

(51) Int. Cl.
    *B62D 15/02*    (2006.01)
    *B62D 5/04*    (2006.01)

(56) References Cited

FOREIGN PATENT DOCUMENTS

| JP | 2003-312413 A | 11/2003 |
|---|---|---|
| JP | 2007-30678 | 2/2007 |
| JP | 2009-190531 A | 8/2009 |
| JP | 2010-228591 | 10/2010 |
| JP | 2012-066709 A | 4/2012 |
| WO | WO 2014/196040 A1 | 12/2014 |

OTHER PUBLICATIONS

Notice of Allowance issued in U.S. Appl. No. 14/392,177 dated Mar. 21, 2017.

* cited by examiner

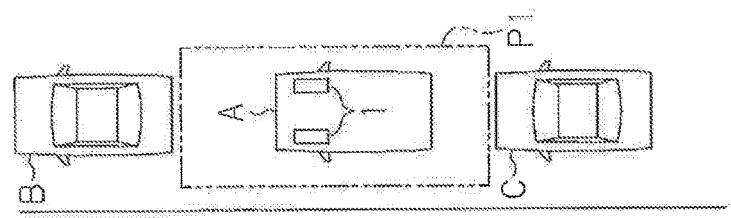
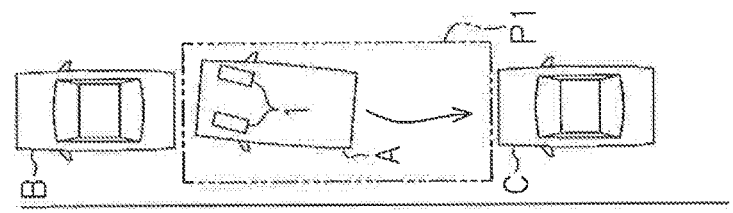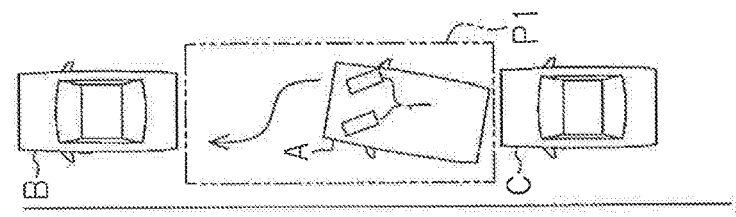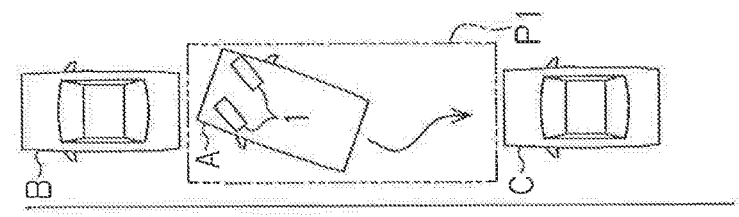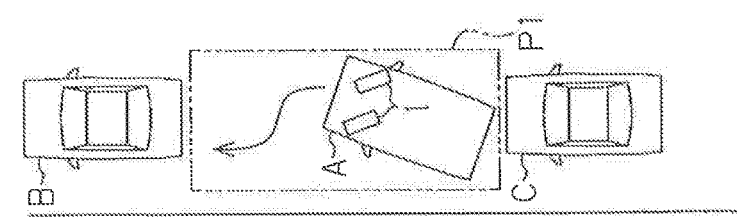

PARKING ASSIST DEVICE

CROSS-REFERENCE TO RELATED APPLICATIONS

This application is a national phase application of International Application No. PCT/JP2013/065619, filed Jun. 5, 2013, the content of which is incorporated herein by reference.

TECHNICAL FIELD

The present invention relates to a parking assist device.

BACKGROUND ART

Some vehicles such as automobiles are known to be equipped with a parking assist device. The parking assist device assists the vehicle when the vehicle is pulled into (is parked in) a certain parking area and pulled out of (starts from) the parking area.

To pull a vehicle into or out of a parking area, the parking assist device operates the steerable wheels of the vehicle through automatic control of the steering device, instead of using steering operation by the driver. Specifically, the vehicle is pulled into the parking area through automatic pulling-in control by which the steering device is automatically operated. The vehicle is pulled out of the parking area through automatic pulling-out control by which the steering device is automatically operated. Through such automatic pulling-in and pulling-out controls, the steerable wheels are operated to pull the vehicle into or out of the parking area without steering operation by the driver. In this manner, the vehicle is assisted to be pulled into or out of the parking area.

When a vehicle is assisted to be pulled into or out of a parking area by a parking assist device, the steerable wheels are operated solely by the power of the actuator, such as a motor, of the steering device through the automatic pulling-in or pulling-out control without depending on any steering operation by the driver. This increases the load acting on the steering device when the automatic pulling-in or pulling-out control is performed compared to usual times. The temperature of the steering device thus tends to increase. As a result, in a vehicle having such a parking assist device, the parking assist device must have improved heat resistance.

In this regard, Patent Document 1 describes a configuration in which automatic pulling-in control is prohibited from starting if the temperature of the steering device is higher than the maximum value of a first temperature range. As a result, even if the temperature of the steering device increases after the automatic pulling-in control is started, the temperature of the steering device is maintained at a sufficiently low value. This restrains cost increase. The maximum value of the first temperature range may be set to a high value such that the condition for executing the automatic pulling-in control is relaxed to increase the execution frequency of the automatic pulling-in control.

PRIOR ART DOCUMENTS

Patent Documents

Patent Document 1: Japanese Laid-Open Patent Publication No. 2010-228591

SUMMARY OF THE INVENTION

Problems that the Invention is to Solve

In the configuration in which the automatic pulling-in control is prohibited from starting when the temperature of the steering device is higher than the maximum value of the first temperature range as described in Patent Document 1, the execution frequency of the automatic pulling-in control may be increased by setting the maximum value to a high value.

However, if the maximum value of the first temperature range is set to a high value as has been described, unfavorable temperature increase may occur in the steering device after automatic pulling-control is started. In such a case, it is difficult to maintain the temperature of the steering device at a sufficiently low value after the automatic pulling-in control is started in the following situations. That is, if the automatic pulling-out control is performed subsequent to execution of the automatic pulling-in control to start over the parking operation of the vehicle after the automatic pulling-in control is started, the temperature of the steering device is increased also in the automatic pulling-out control, which is performed subsequent to execution of the automatic pulling-in control. This makes it difficult to maintain the temperature of the steering device at a sufficiently low value.

To avoid this, the technique disclosed in Patent Document 1 suspends the automatic pulling-in or pulling-out control is suspended if the temperature of the steering device becomes higher than the maximum value of a second temperature range, which is set to a range lower than the maximum value of the first temperature range, after the automatic pulling-in control is started. In this case, when the temperature of the steering device becomes higher than the maximum value of the second temperature range after the automatic pulling-in control is started, the automatic pulling-in or pulling-out control that is currently in execution is suspended. The temperature of the steering device thus can be maintained at a sufficiently low value.

However, if the currently executed automatic pulling-in or pulling-out control is suspended before completion, or, in other words, pulling the vehicle into or out of the parking area through the corresponding automatic pulling-in or pulling-out control is incomplete, the problem described below occurs. That is, after the automatic pulling-in or pulling-out control is suspended before completion, the driver must manually manipulate the steering wheel to continue to pull the vehicle into or out of the parking area. If the driver is not sufficiently skilled, the vehicle cannot be properly pulled into or out of the parking area in some cases.

Accordingly, it is an objective of the present invention to provide a parking assist device capable of increasing execution frequency of automatic pulling-in control as much as possible while avoiding suspension of automatic pulling-in or pulling-out control caused by temperature increase of a steering device after the automatic pulling-in control is started.

Means for Solving the Problems

Means for achieving the above objective and advantages thereof will now be discussed.

To achieve the foregoing objective and in accordance with one aspect of the present invention, a parking assist device is provided that is capable of performing automatic pulling-in control to automatically operate a steering device to assist a vehicle to be pulled into a parking area and automatic pulling-out control to automatically operate the steering device to assist the vehicle to be pulled out of the parking area. When the automatic pulling-in control is started, a temperature increase amount $\Delta Ti$ of the steering device caused by execution of the automatic pulling-in control is calculated, and a temperature increase amount $\Delta To$ of the steering device caused by execution of the automatic pulling-out control is calculated. Based on a current temperature T of the steering device, the temperature increase amount $\Delta Ti$, and the temperature increase amount $\Delta To$, a predicted temperature Tf2 of the steering device of a case in which the automatic pulling-out control is performed subsequent to execution of the automatic pulling-in control is obtained. The automatic pulling-in control is permitted to start if the predicted temperature Tf2 is less than an allowable upper limit Tm. The automatic pulling-in control is prohibited from starting if the predicted temperature Tf2 is higher than or equal to the allowable upper limit Tm.

Thus, start of the automatic pulling-in control is avoided in a state in which the temperature of the steering device is likely to become higher than or equal to the allowable upper limit Tm if the automatic pulling-out control is performed subsequent to execution of the automatic pulling-in control to start over the parking operation of the vehicle. If the automatic pulling-in control is started in the aforementioned state, the temperature of the steering device may become higher than or equal to the allowable upper limit Tm. In this case, to avoid such temperature increase, the automatic pulling-in or pulling-out control that is currently in execution may have to be suspended. However, since the automatic pulling-in control is prohibited from starting in the aforementioned state, suspension of the automatic pulling-in or pulling-out control due to temperature increase of the steering device after start of the automatic pulling-in control is avoided. Also, even in the aforementioned state, the automatic pulling-in control is permitted to start as long as the predicted temperature Tf2 is less than the allowable upper limit Tm. This increases the execution frequency of the automatic pulling-in control as much as possible.

Prior to determination whether the predicted temperature Tf2 is less than the allowable upper limit Tm, the control section may perform the following procedure. That is, the control section may obtain a predicted temperature Tf1 of a case in which the automatic pulling-in control is performed based on the current temperature T and the temperature increase amount $\Delta Ti$ of the steering device, and permit the automatic pulling-in control to start if the predicted temperature Tf1 is less than a determination value Th1, which is lower than the allowable upper limit Tm. In this case, the automatic pulling-in control is permitted to start not only when the predicted temperature Tf2 is less than the allowable upper limit Tm but also when the predicted temperature Tf1 is less than the determination value Th1, which is lower than the allowable upper limit Tm. This further increases the execution frequency of the automatic pulling-in control.

The calculating section may be configured to calculate the temperature increase amount $\Delta Ti$ and the temperature increase amount $\Delta To$ based on the size of the parking area.

The calculating section may be configured to: calculate the temperature increase amount $\Delta Ti$ based on the difference between the size of the parking area and the size of the vehicle with reference to a first map; and calculate the temperature increase amount $\Delta To$ based on the difference between the size of the parking area and the size of the vehicle with reference to a second map.

Further, the calculating section may be configured to: calculate the temperature increase amount $\Delta Ti$ based on a pulling-in path used to assist the vehicle to be pulled into the parking area through the automatic pulling-in control; and calculate the temperature increase amount $\Delta To$ based on a pulling-out path used to assist the vehicle to be pulled out of the parking area through the automatic pulling-out control.

The control section may also be configured to: monitor an operating state of the steering device when performing the automatic pulling-in control; and provide a corresponding alarm through an alarming section when determining that the operating state of the steering device corresponds to a state in which the temperature of the steering device is likely to increase by an amount exceeding the temperature increase amount $\Delta Ti$ during the execution of the automatic pulling-in control. The actual operating state of the steering device brought about by the automatic pulling-in control does not necessarily agree with an operating state that will cause the temperature increase amount $\Delta Ti$. That is, the actual operating state does not necessarily agree with a predicted operating state. If the actual operating state does not agree with to the predicted operating state, the temperature of the steering device may increase by an amount exceeding the temperature increase amount $\Delta Ti$. However, if the operating state of the steering device indicates that the temperature of the steering device is likely to increase by an amount exceeding the temperature increase amount $\Delta Ti$ through execution of the automatic pulling-in control, the alarming section is operated to provide a corresponding alarm. The alarm allows the driver to suspend the automatic pulling-in control and manually pull the vehicle into the parking area.

BRIEF DESCRIPTION OF THE DRAWINGS

FIG. 4 is another schematic diagram illustrating the parking manner through the automatic control of the steering device;

FIG. 5 is another schematic diagram illustrating the parking manner through the automatic control of the steering device;

FIG. 6 is another schematic diagram illustrating the parking manner through the automatic control of the steering device;

FIG. 7 is another schematic diagram illustrating the parking manner through the automatic control of the steering device;

FIG. 8 is another schematic diagram illustrating the parking manner through the automatic control of the steering device;

MODES FOR CARRYING OUT THE INVENTION

A parking assist device according to one embodiment will now be described with reference to FIGS. 1 to 15.

Figure 1:
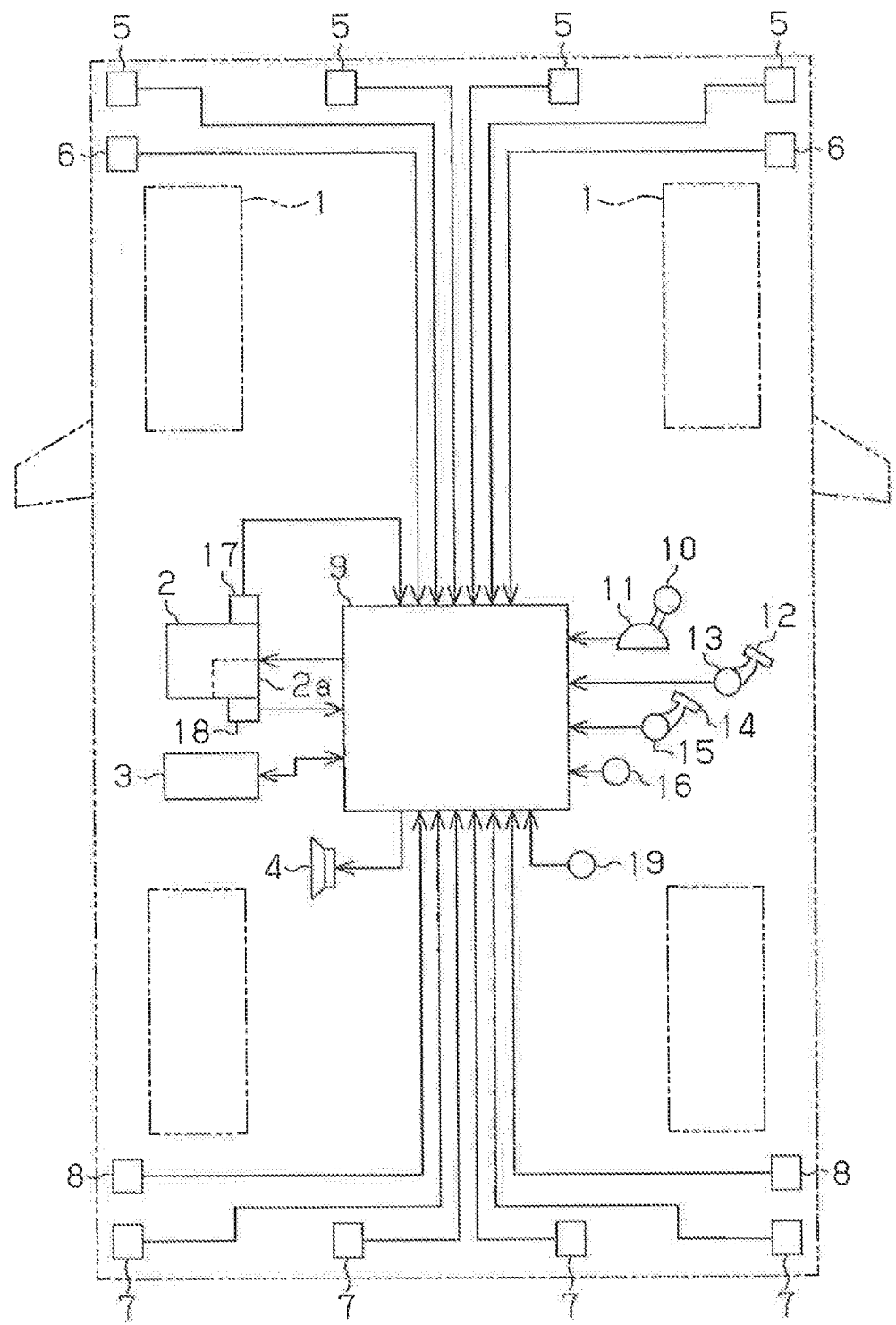
FIG. 1 is a schematic diagram showing a vehicle employing a parking assist device as a whole.

The vehicle illustrated in FIG. 1 includes a steering device 2, which operates steerable wheels 1 to adjust the advancing direction of the vehicle. The steering device 2 operates the steerable wheels 1 through steering operation by the driver and has a function of assisting in the driver's steering operation by means of a motor 2a. The steering device 2 is also capable of operating the steerable wheels 1 solely through the motor 2a, regardless of with or without the driver's steering operation. For the driver seat of the vehicle, a display panel 3 with a touch sensor and a speaker 4 are provided. The display panel 3 displays information regarding driving and is manipulated by the driver for various purposes. The speaker 4 provides information regarding driving and alarms the driver using sound.

Clearance sonars 5 for detecting whether there is an object in the vicinity of the front end (the upper end as viewed in FIG. 1) of the vehicle are attached to the front end of the vehicle. Ultrasonic sensors 6 for detecting whether there is an object at the corresponding side of the vehicle in the width direction are attached to the side surfaces of the front portion of the vehicle in the width direction (the lateral direction as viewed in the drawing). Clearance sonars 7 for detecting whether there is an object in the vicinity of the rear end (the lower end as viewed in the drawing) of the vehicle are attached to the rear end of the vehicle. Ultrasonic sensors 8 for detecting whether there is an object at the corresponding side of the vehicle in the width direction are attached to the side surfaces of the rear portion of the vehicle in the width direction.

The clearance sonars 5, 7 and the ultrasonic sensors 6, 8 are connected to an electronic control unit 9, which performs various types of control on the vehicle. The electronic control unit 9 is connected to a shift position sensor 11 for detecting the position of a shift lever 10, which is manipulated by the driver, an accelerator position sensor 13 for detecting the depression amount of an accelerator pedal 12, which is depressed by the driver, and a brake switch 15 for detecting whether a brake pedal 14 is depressed by the driver. The electronic control unit 9 is also connected to a vehicle wheel speed sensor 16 for detecting the rotation speed of a wheel (such as the steerable wheels 1) of the vehicle, an angle sensor 17 for detecting the steering operation angle of the steering device 2, a temperature sensor 18 for detecting the temperature of a motor 2a of the steering device 2, and a yaw rate sensor 19 for detecting the changing rate of the rotation angle when the vehicle turns.

The electronic control unit 9 controls the steering device 2, the display panel 3, and the speaker 4 and receives signals from the display panel 3 based on manipulation of the display panel 3 by the driver. When the vehicle is pulled into (parked in) a predetermined parking area or pulled out of (started from) the parking area, the electronic control unit 9 assists the vehicle to be pulled into or out of the parking area. That is, to pull the vehicle into the parking area, the electronic control unit 9 operates the steerable wheels 1 through automatic pulling-in control, by which the steering device 2 (the motor 2a) is automatically operated, instead of using steering operation by the driver. In this manner, the vehicle is assisted to be pulled into the parking area by the electronic control unit 9. Also, to pull the vehicle out of the parking area, the electronic control unit 9 operates the steerable wheels 1 through automatic pulling-out control, by which the steering device 2 (the motor 2a) is automatically operated, instead of using steering operation by the driver. In this manner, the vehicle is assisted to be pulled out of the parking area by the electronic control unit 9.

Such assist for the vehicle to pull the vehicle into the parking area (hereinafter, referred to as pulling-in assist) is started if the pulling-in assist for the vehicle with respect to the parking area is requested through manipulation of the display panel 3 by the driver. Also, assist for the vehicle to pull the vehicle out of the parking area (hereinafter, referred to as pulling-out assist) is started if the pulling-out assist for the vehicle with respect to the parking area is requested through manipulation of the display panel 3 by the driver. Hereinafter, the pulling-in assist and the pulling-out assist will each be described generally.

[Pulling-in Assist]

After the pulling-in assist is started, the electronic control unit 9 instructs the driver to perform measurement starting operation as preparation for size measurement of the parking area through display on the display panel 3 and sound from the speaker 4. For example, the driver is instructed to stop the host vehicle A in a front-facing state at the position represented by the solid lines in FIG. 2, which is the position beside the parking area P1 between other vehicles B and C, at which the host vehicle A is located immediately before reaching the zone corresponding to the parking area P1 after advancing toward the parking area P1. Then, with the host vehicle A stopped at the position, the driver is instructed to release the brake pedal 14 with the shift lever 10 (FIG. 1) at the drive position.

On condition that the driver has accomplished the above-described measurement starting operation, the electronic control unit 9 performs a measurement procedure for measuring the size of the parking area P1 (FIG. 2) using the clearance sonars 5, 7 and the ultrasonic sensors 6, 8. In the measurement procedure, the host vehicle A is moved from the position represented by the solid lines in FIG. 2 to the position represented by the long dashed double-short dashed lines, which is the position at which the host vehicle A is located immediately after passing the zone beside the parking area P1. While the host vehicle A is moved from the position represented by the solid lines to the position represented by the long dashed double-short dashed lines, the electronic control unit 9 monitors signals from the clearance sonars 5, 7, the ultrasonic sensors 6, 8, the vehicle wheel speed sensor 16, the angle sensor 17, and the yaw rate sensor 19, which are illustrated in FIG. 1. Then, based on the signals from these sensors, the electronic control unit 9 determines the size of the parking area P1 and the position of the host vehicle A relative to the parking area P1.

Figure 2:
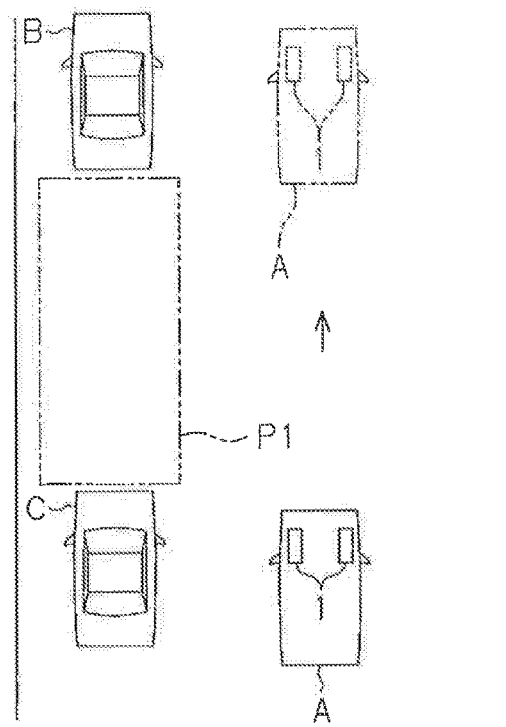
FIG. 2 is a schematic diagram illustrating movement of a host vehicle when the size of a parking area is measured.

Then, based on the size of the parking area P1, the electronic control unit 9 determines the path by which the target vehicle A will be pulled into the parking area P1 from the position represented by the long dashed double-short dashed lines in FIG. 2. Specifically, the electronic control unit 9 stores the size of the host vehicle A, which depends on the specifications of the host vehicle A. Therefore, based on the margin of the size of the parking area P1 in relation to the size of the host vehicle A, the electronic control unit 9 determines the aforementioned pulling-in path. The electronic control unit 9 then instructs the driver to manipulate the accelerator pedal 12, the brake pedal 14, and the shift lever 10 such that the host vehicle A moves along the path determined in the above-described manner. The electronic control unit 9 also performs the automatic pulling-in control, by which the steering device 2 (the motor 2*a*) is automatically operated, in correspondence with manipulation by the driver according to instructions. The automatic pulling-in control operates the steerable wheels 1 to move the host vehicle A along the aforementioned path solely through actuation of the motor 2*a* of the steering device 2, without steering operation by the driver. In this manner, the host vehicle A is assisted to be pulled into the parking area P1. In such assist for the host vehicle A to pull the host vehicle A into the parking area P1, not only the steering device 2 is automatically operated as has been described, but also drive force adjustment, brake actuation, and shift position change of the host vehicle A for moving the host vehicle A along the aforementioned path may be automatically performed.

FIGS. 3 to 8 illustrate an example of operating modes of the steerable wheels 1 according to the automatic pulling-in control for moving the host vehicle A along the aforementioned path.

Figure 3:
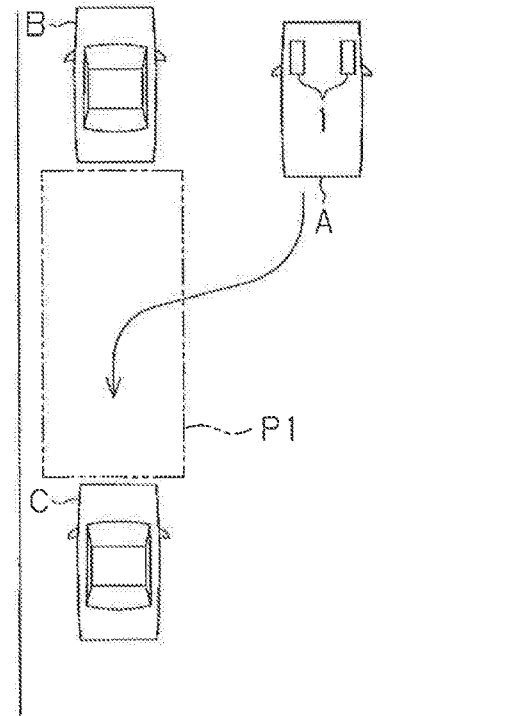
FIG. 3 is a schematic diagram illustrating a parking manner through automatic control of a steering device.
Figure 9:
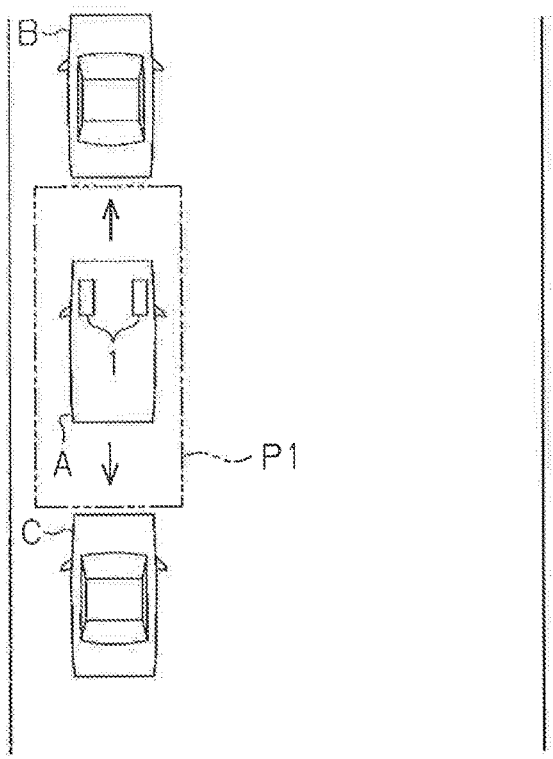
FIG. 9 is a schematic diagram illustrating movement of the host vehicle when the size of a parking area is measured.

In the automatic pulling-in control, the steerable wheels 1 are operated through actuation of the motor 2*a* of the steering device 2 such that the host vehicle A moves into the parking area P1 as indicated by the arrow in FIG. 3. Then, with the host vehicle A stopped at the position represented in FIG. 4, the steerable wheels 1 are operated through actuation of the motor 2*a* until the steerable wheels 1 become oriented maximally leftward as viewed in the drawing. After changing the orientation of the steerable wheels 1 in this manner, the steerable wheels 1 are operated through actuation of the motor 2*a* of the steering device 2 such that the host vehicle A moves in the parking area P1 as indicated by the arrow in FIG. 4. Afterwards, with the host vehicle A stopped at the position represented in FIG. 5, the steerable wheels 1 are operated through actuation of the motor 2*a* until the steerable wheels 1 become oriented maximally rightward as viewed in the drawing. After changing the orientation of the steerable wheels 1 in this manner, the steerable wheels 1 are operated through actuation of the motor 2*a* of the steering device 2 such that the host vehicle A moves in the parking area P1 as indicated by the arrow in FIG. 5.

Subsequently, with the host vehicle A stopped at the position represented in FIG. 6, the steerable wheels 1 are operated through actuation of the motor 2*a* until the steerable wheels 1 become oriented leftward to a certain extent as viewed in the drawing. After changing the orientation of the steerable wheels 1 in this manner, the steerable wheels 1 are operated through actuation of the motor 2*a* of the steering device 2 such that the host vehicle A moves in the parking area P1 as indicated by the arrow in FIG. 6. Afterwards, with the host vehicle A stopped at the position represented in FIG. 7, the steerable wheels 1 are operated through actuation of the motor 2*a* until the steerable wheels 1 become oriented rightward to a certain extent as viewed in the drawing. After changing the orientation of the steerable wheels 1 in this manner, the steerable wheels 1 are operated through actuation of the motor 2*a* of the steering device 2 such that the host vehicle A moves in the parking area P1 as indicated by the arrow in FIG. 7. As a result, as illustrated in FIG. 8, the host vehicle A is moved to and stopped at the parking position in the parking area P1 and parking the host vehicle A in the parking area P1 is thus completed.

In the above-described automatic pulling-in control, the steerable wheels 1 are operated solely through actuation of the motor 2*a* of the steering device 2 without steering operation by the driver. This increases the load on the motor 2*a*. In other words, an increased electric current flows in the motor 2*a* of the steering device 2 to actuate the motor 2*a*. As a result, when the automatic pulling-in control is performed, the motor 2*a* of the steering device 2 tends to be heated. Further, when an electric current is supplied to the steering device 2 to actuate the motor 2*a*, the electric current flows not only in the motor 2*a* but also in a control unit (ECU) for controlling the motor 2*a*. The ECU is thus also heated in the same manner as the motor 2*a* when the motor 2*a* is heated. The amount of temperature increase of the steering device 2 caused by execution of the automatic pulling-in control becomes particularly great when operation for changing the orientation of the steerable wheels 1 through actuation of the motor 2*a* is performed with the host vehicle A maintained in a stopped state. Specifically, the load of the motor 2*a* is greater and thus tends to become more heated when the operation for changing the orientation of the steerable wheels 1 through actuation of the motor 2*a* is performed with the host vehicle A maintained in a stopped state than when the operation for changing the orientation of the steerable wheels 1 through actuation of the motor 2*a* is executed with the host vehicle A in a running state.

[Pulling-out Assist]

When the pulling-out assist is started, the electronic control unit 9 instructs the driver to perform the measurement starting operation as preparation for the size measurement of the parking area through display on the display panel 3 and sound from the speaker 4. For example, with the host vehicle A maintained in the parking area P1 as represented by the solid lines in FIG. 9, the driver is instructed to release the brake pedal 14 with the shift lever (FIG. 1) at the drive position.

On condition that the driver has accomplished the above-described measurement starting operation, the electronic control unit 9 performs the measurement procedure for measuring the size of the parking area P1 (FIG. 9) using the clearance sonars 5, 7 and the ultrasonic sensors 6, 8. In the measurement procedure, the electronic control unit 9 operates to move the host vehicle A reciprocally in the front-rear direction in such a range that the host vehicle A does not contact obstacles such as the vehicles B, C as indicated by the arrows in FIG. 9, while monitoring signals from the clearance sonars 5, 7 and the ultrasonic sensors 6, 8, which are illustrated in FIG. 1. Also, when performing the aforementioned reciprocal movement, the electronic control unit 9 monitors signals from the clearance sonars 5, 7, the ultrasonic sensors 6, 8, the vehicle wheel speed sensor 16, the angle sensor 17, and the yaw rate sensor 19. Based on the signals from these sensors, the electronic control unit 9 obtains the size of the parking area P1 and the position of the host vehicle A relative to the parking area P1.

Then, based on the size of the parking area P1, or, more specifically, based on the margin of the size of the parking area P1 in relation to the size of the host vehicle A, the electronic control unit 9 obtains the path for pulling out the host vehicle A. The electronic control unit 9 then instructs the driver to manipulate the accelerator pedal 12, the brake pedal 14, and the shift lever 10 such that the host vehicle A moves along the path determined in the above-described manner. The electronic control unit 9 also performs the automatic pulling-out control, by which the steering device 2 (the motor 2a) is automatically operated, in correspondence with manipulation by the driver according to instructions. The automatic pulling-out control operates the steerable wheels 1 to move the host vehicle A along the aforementioned path solely through actuation of the motor 2a of the steering device 2, without steering operation by the driver. In this manner, the host vehicle A is assisted to be pulled out of the parking area P1. In such assist for the host vehicle A to pull the host vehicle A out of the parking area P1, not only the steering device 2 is automatically operated, as has been described, but also drive force adjustment, brake actuation, and shift position change of the host vehicle A for moving the host vehicle A along the aforementioned path may be automatically performed.

In the automatic pulling-out control for moving the host vehicle A along the aforementioned path, the motor 2a is actuated to operate the steerable wheels 1 in the manner opposite to the manner illustrated in FIGS. 3 to 8 in which the steerable wheels 1 are operated such that the host vehicle A is pulled into the parking area P1. Also in the automatic pulling-out control of the steering device 2, the steerable wheels 1 are operated solely through actuation of the motor 2a of the steering device 2 without steering operation by the driver, as in the above-described automatic pulling-in control. The load on the motor 2a is thus increased. As a result, when the automatic pulling-out control is performed, the motor 2a and the ECU of the steering device 2 tend to become heated. The temperature increase amount of the motor 2a and that of the ECU increase particularly when operation for changing the orientation of the steerable wheels 1 through actuation of the motor 2a is performed with the host vehicle A maintained in a stopped state in the automatic pulling-out control.

To maintain the temperatures of the motor 2a and the ECU of the steering device 2 each at a sufficiently low value, the automatic pulling-in control may be prohibited from starting if the temperature of the motor 2a is higher than or equal to a determination value before the automatic pulling-in control is started. In this case, the execution frequency of the automatic pulling-in control may be increased by setting the determination value to a high value to increase. However, if the automatic pulling-out control is performed subsequent to execution of the automatic pulling-in control to start over the parking operation of the vehicle after the automatic pulling-in control is started, unfavorable temperature increase of the motor 2a and the ECU may be caused. Such temperature increase of the motor 2a and the ECU, which occurs after the automatic pulling-in control is started, makes it difficult to maintain the temperatures of the motor 2a and the ECU each at a sufficiently low value.

Alternatively, while the determination value is set to a high value to increase the execution frequency of the automatic pulling-in control, the temperature of the motor 2a may be monitored after the automatic pulling-in control is started. In this case, if the temperature of the motor 2a cannot be maintained at a sufficiently low value, the automatic pulling-in or pulling-out control may be suspended without completion to prevent temperature increase of the motor 2a and the ECU. However, if the automatic pulling-in or pulling-out control is suspended before completion, the driver must continue to pull the host vehicle A into or out of the parking area P1 through manual operation of the steering wheel afterwards. In this case, if the driver is not sufficiently skilled, the host vehicle A cannot be properly pulled into or out of the parking area in some cases.

To solve this problem, the parking assist device of the present embodiment performs the procedures (D1) and (D2), as will be described, through the electronic control unit 9.

(D1) When the automatic pulling-in control is started, the temperature increase amount $\Delta Ti$ of the steering device 2 (the motor 2a) caused by execution of the automatic pulling-in control and the temperature increase amount $\Delta To$ of the steering device 2 (the motor 2a) caused by execution of the automatic pulling-out control are calculated. The electronic control unit 9 functions as a calculating section when performing this procedure.

(D2) Based on the current temperature T of the steering device 2 (the motor 2a) and the temperature increase amounts $\Delta Ti$ and $\Delta To$, which have been calculated in the procedure (D2), the predicted temperature Tf2 in a case in which the automatic pulling-out control is performed subsequent to execution of the automatic pulling-in control is determined. If the predicted temperature Tf2 is less than the allowable upper limit Tm, the automatic pulling-in control is permitted to start. In contrast, if the predicted temperature Tf2 is higher than or equal to the allowable upper limit Tm, the automatic pulling-in control is prohibited from starting. The electronic control unit 9 functions as a control section when performing the procedure (D2). The allowable upper limit Tm may be the maximum value of a temperature range of the motor 2a that prevents hampering of operation of the motor 2a.

The electronic control unit 9 constantly monitors the electric current flowing in the motor 2a regardless of whether the automatic pulling-in or pulling-out control is in execution. As a procedure for restraining temperature increase of the motor 2a, the electronic control unit 9 performs an electric current limiting procedure for limiting the electric current flowing in the motor 2a to a value less than a limit value such that the electric current does not become greater than or equal to the limit value. The electric current limiting procedure limits the electric current flowing in the motor 2a to the limit value when the electric current becomes greater than or equal to the limit value. This facilitates maintenance of the temperature of the motor 2a and the temperature of the ECU of the steering device 2 each at a sufficiently low value. The electronic control unit 9 changes the aforementioned limit value, which is used in the electric current limiting procedure, in correspondence with the current temperature T of the motor 2a.

Figure 10:
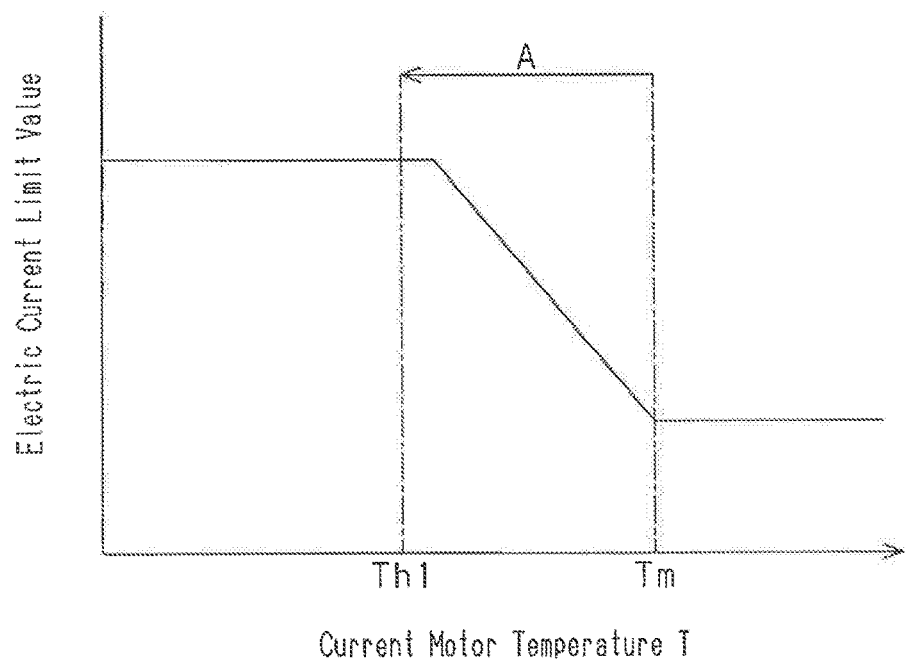
FIG. 10 is a graph representing changes in an electric current limit value in correspondence with changes in the current temperature T of the motor.

FIG. 10 is a graph representing changes in the limit value in correspondence with changes in the current temperature T of the motor 2a. As is clear from the graph, the limit value is changed as represented by the solid line in the graph as the current temperature T of the motor 2a increases. That is, when the current temperature T is high, or, for example, higher than the determination value Th1, the limit value is gradually decreased from the normal value as the current temperature T is increased. The limit value then becomes minimized when the current temperature T becomes higher than or equal to the aforementioned allowable upper limit Tm, which is higher than the determination value Th1. By changing the limit value in correspondence with changes in the current temperature T in this manner, temperature increase of the motor 2a and the ECU is restrained through limitation of the electric current flowing in the motor 2a based on the limit value.

Operation of the parking assist device will hereafter be described.

If the parking assist device starts the automatic pulling-in control, the above-described procedures (D1) and (D2) are performed through the electronic control unit 9. This ensures avoidance of start of the automatic pulling-in control in a state in which the temperature of the motor 2a of the steering device 2 is likely to become higher than or equal to the allowable upper limit Tm when the automatic pulling-out control is performed subsequent to execution of the automatic pulling-in control to start over the parking operation. If the automatic pulling-in control is started in the aforementioned state, the temperature of the motor 2a may become higher than or equal to the allowable upper limit Tm. In this case, to avoid such temperature increase, the automatic pulling-in or pulling-out control that is currently in execution may have to be suspended. However, since the automatic pulling-in control is prohibited from starting in the aforementioned state, suspension of the automatic pulling-in or pulling-out control due to temperature increase of the motor 2a after start of the automatic pulling-in control is avoided. Also, even in the aforementioned state, the automatic pulling-in control is permitted to start as long as the predicted temperature Tf2 is less than the allowable upper limit Tm. This increases the execution frequency of the automatic pulling-in control as much as possible.

Figure 11:
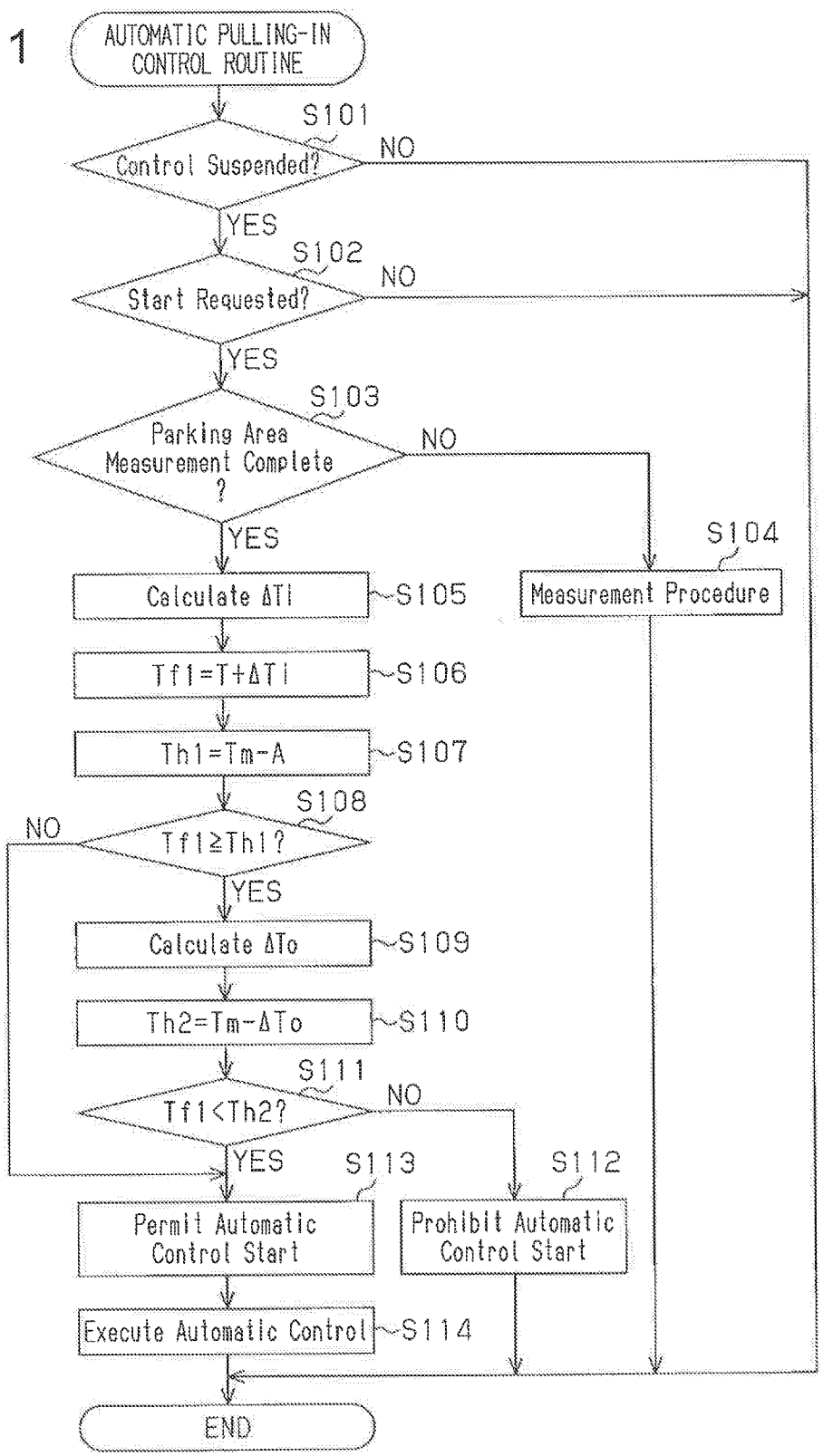
FIG. 11 is a flowchart representing a procedure for selectively prohibiting and permitting execution of automatic pulling-in control based on a predicted temperature Tf2.

FIG. 11 is a flowchart representing an automatic pulling-in control routine for selectively prohibiting and permitting execution of the automatic pulling-in control based on the aforementioned predicted temperature Tf2. The automatic pulling-in control routine is periodically performed through the electronic control unit 9 in an interrupting manner at predetermined time intervals.

The electronic control unit 9 determines whether the automatic pulling-in control is currently suspended as Step 101 (S101) of the routine. If a positive determination is made in this step, the electronic control unit 9 suspends the automatic pulling-in control routine. In contrast, if a negative determination is made in S101, the electronic control unit 9 performs S102. As S102, the electronic control unit 9 determines whether a command for starting pulling-in assist for the vehicle with respect to a parking area has been generated. The command for starting the pulling-in assist is generated through manipulation of the display panel 3 by the driver to start the pulling-in assist. When a negative determination is made in S102, the electronic control unit 9 suspends the automatic pulling-in control routine. If a positive determination is made in S102, the electronic control unit 9 performs S103.

As S103, the electronic control unit 9 determines whether size measurement of the parking area P1 has been complete. If a negative determination is made in this step, S104 is performed. As S104, the electronic control unit 9 executes a measurement procedure for measuring the size of the parking area P1. Specifically, on condition that the driver has accomplished the measurement starting operation for the pulling-in or pulling-out assist, the electronic control unit 9 performs the aforementioned measurement procedure to measure the size of the parking area P1 through the measurement procedure. After the size measurement of the parking area P1 is completed through the measurement procedure, a positive determination is made in S103 and S105 is performed.

In the automatic pulling-in control routine, the S105 and S109 to S113 correspond to the above-described procedures (D1) and (D2). Through S105 and S109 to S113, the automatic pulling-in control is prohibited from starting (S112) or permitted to start (S113). When the automatic pulling-in control is prohibited from starting, the electronic control unit 9 suspends the automatic pulling-in control routine. If the automatic pulling-in control is permitted to start, the electronic control unit 9 performs the automatic pulling-in control as S114 and then suspends the automatic pulling-in control routine. The S105 and the subsequent steps will hereafter be described in detail.

As S105, the electronic control unit 9 calculates the temperature increase amount ΔTi of the motor 2a of the steering device 2, which is caused by execution of the automatic pulling-in control. Specifically, as the difference between the size of the parking area P1 and the size of the host vehicle A, the electronic control unit 9 obtains the margin length ΔL, which is the value obtained by subtracting the length (the full length) of the host vehicle A in the front-rear direction from the length of the parking area P1 in the front-rear direction of the host vehicle A (the length in the up-down direction as viewed in FIGS. 2 to 8). The smaller the margin length ΔL, the greater the number of times the steerable wheels 1 are operated to change the orientation of the steerable wheels 1 with the host vehicle A maintained in a stopped state in the path for pulling the host vehicle A into the parking area P1. Also, the greater the number of times such operation of the steerable wheels 1 is performed, the greater the load on the motor 2a for moving the host vehicle A along the aforementioned path through the automatic pulling-in control. The temperature increase amount of the motor 2a caused by execution of the automatic pulling-in control thus becomes correspondingly higher. In S105, the temperature increase amount ΔTi is calculated based on the margin length ΔL (which corresponds to the size of the parking area P1) with reference to a first map, which defines the relationship between the margin length ΔL and the temperature increase amount of the motor 2a.

Figure 12:
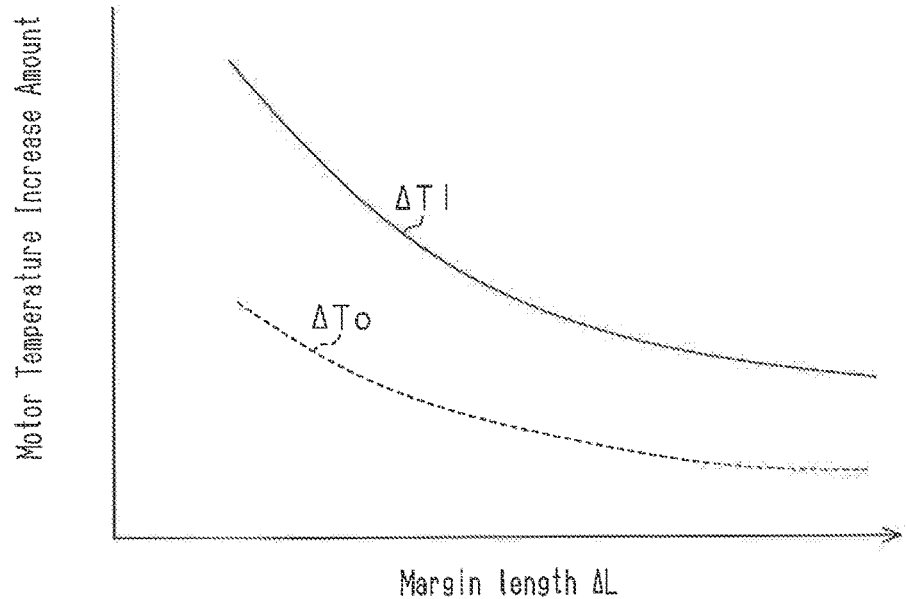
FIG. 12 is a graph representing changes in the temperature increase amount of the motor through the automatic pulling-in control in correspondence with changes in margin length.

The solid line in FIG. 12 represents a manner in which the temperature increase amount ΔTi, which is calculated referring to the aforementioned first map, decreases as the margin length ΔL increases. As the margin length ΔL increases, the aforementioned temperature increase amount ΔTi decreases as represented by the solid line in FIG. 12.

In the automatic pulling-in control routine of FIG. 11, prior to the series of S105 and S109 to S113, which correspond to the procedures of (D1) and (D2), for determining whether the aforementioned predicted temperature Tf2 is less than the permitted upper limit Tm, the S106 to S108 for further increasing the execution frequency of the automatic pulling-in control are performed. The S106 to S108 are performed through the electronic control unit 9 in the manner described below.

As S106, based on the current temperature T and the aforementioned temperature increase amount ΔTi of the motor 2a, the electronic control unit 9 obtains the predicted temperature Tf1 of the motor 2a in a case in which the automatic pulling-in control is performed. Specifically, the electronic control unit 9 adds the temperature increase amount ΔTi to the current temperature T, thus determining the predicted temperature Tf1 of the motor 2a in a case in which the host vehicle A is completely pulled into the parking area through the automatic pulling-in control. Then, in S107, the electronic control unit 9 obtains the value obtained by subtracting the predetermined value A from the allowable upper limit Tm as the determination value Th1. The electronic control unit 9 then determines whether the predicted temperature Tf1 is higher than or equal to the determination value Th1 in S108.

Figure 13:
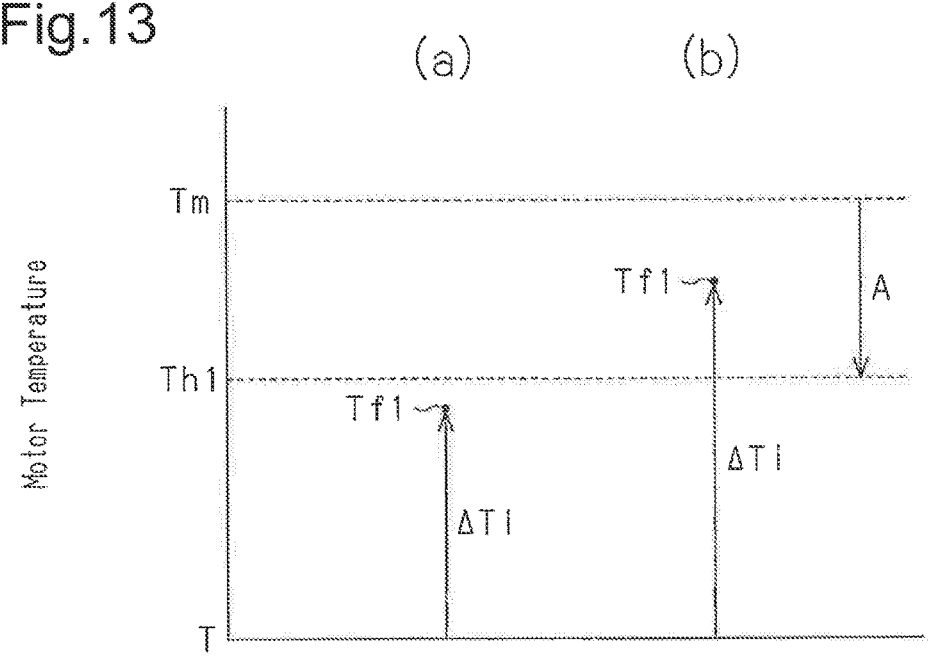
FIG. 13 is a graph representing the relationship among the predicted temperature Tf1, the current temperature T, a determination value Th1, an allowable upper limit Tm, and a predetermined value A.

In FIG. 13, section (a) corresponds to a positive determination in S108 and represents the relationship among the predicted temperature Tf1, the current temperature T, the determination value Th1, the allowable upper limit Tm, and the predetermined value A. Section (b) corresponds to a negative determination in S108 and represents the relationship among the predicted temperature Tf1, the current temperature T, the determination value Th1, the allowable upper limit Tm, and the predetermined value A. As is represented in section (a) of FIG. 13, if the predicted temperature Tf1 is less than the determination value Th1, S113 is performed directly without performing S109 to S112 of FIG. 11.

In this case, S113 is performed to permit the automatic pulling-in control to start not only when the predicted temperature Tf2 is less than the allowable upper limit Tm but also when the predicted temperature Tf1 is less than the determination value Th1, which is lower than the allowable upper limit Tm. This further increases the execution frequency of the automatic pulling-in control. The predetermined value A, which is used to determine the determination value Th1, may be a fixed value determined in advance through tests or the like, which is, for example, a temperature increase amount of the motor 2a caused by execution of the automatic pulling-out control under the most unfavorable temperature increase of the motor 2a.

If it is determined that the predicted temperature Tf1 is higher than or equal to the determination value Th1 in S108, S109 is performed. As S109, the electronic control unit 9 calculates the temperature increase amount ΔTo of the motor 2a caused by execution of the automatic pulling-out control. The smaller the margin length ΔL, the greater the number of times the steerable wheels 1 are operated to change the orientation of the steerable wheels 1 with the host vehicle A maintained in a stopped state in the path for pulling the host vehicle A out of the parking area P1. Also, the greater the number of times such operation of the steerable wheels 1 is performed, the greater the load on the motor 2a for moving the host vehicle A along the aforementioned path through the automatic pulling-out control. The temperature increase amount of the motor 2a caused by execution of the automatic pulling-out control thus becomes correspondingly greater. In S109, the temperature increase amount ΔTo is calculated based on the margin length ΔL (which corresponds to the size of the parking area P1) with reference to a second map, which defines the relationship between the margin length ΔL and the temperature increase amount of the motor 2a.

The broken line in FIG. 12 represents the manner in which the temperature increase amount ΔTo, which is calculated referring to the aforementioned second map, decreases as the margin length ΔL increases. As the margin length ΔL increases, the temperature increase amount ΔTi decreases as represented by the broken line in FIG. 12. In FIG. 12, the broken line (the temperature increase amount ΔTo) is located lower (in a lower range) than the solid line (the temperature increase amount ΔTi), as viewed in the graph. This is caused by the fact that pulling the host vehicle A out of the parking area P1 is easier than pulling the host vehicle A into the parking area P1. That is, the steerable wheels 1 are operated a fewer number of times to change the orientation of the steerable wheels 1 with the host vehicle A maintained in a stopped state when the host vehicle A is pulled into the parking area P1 than when the host vehicle A is pulled out of the parking area P1.

Subsequently, as S110, the electronic control unit 9 obtains the determination value Th1 as the value obtained by subtracting the temperature increase amount ΔTo from the allowable upper limit Tm. Then, as S111, the electronic control unit 9 determines whether the predicted temperature Tf1 is less than the determination value Th2, or, in other words, the expression described below is satisfied.

$$Tf1 < Th2 \tag{1}$$

Figure 14:
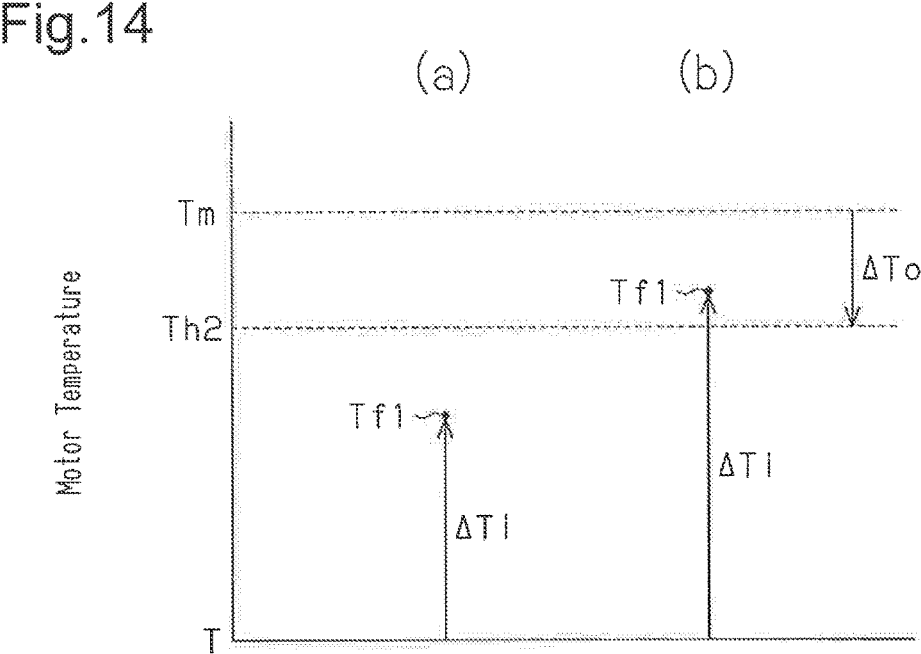
FIG. 14 is a graph representing the relationship among the predicted temperature Tf1, the current temperature T, a temperature increase amount ΔTi, a determination value Th2, the allowable upper limit Tm, and a temperature increase amount ΔTo.

Section (a) of FIG. 14 represents the relationship among the predicted temperature Tf1, the current temperature T, the temperature increase amount ΔTi, the determination value Th2, the allowable upper limit Tm, and the temperature increase amount ΔTo corresponding to a positive determination in S110. Section (b) of FIG. 14 represents the relationship among the predicted temperature Tf1, the current temperature T, the temperature increase amount ΔTi, the determination value Th2, the allowable upper limit Tm, and the temperature increase amount ΔTo corresponding to a negative determination in S110.

The relationship represented by the expression described below is satisfied among the predicted temperature Tf1, the current temperature T, the temperature increase amount ΔTi, the determination value Th2, the allowable upper limit Tm, the temperature increase amount ΔTo, and the predicted temperature Tf2.

$$Tf1 = T + \Delta Ti \tag{2}$$

$$Th2 = Tm - \Delta To \tag{3}$$

$$T + \Delta Ti + \Delta To = Tf2 \tag{4}$$

Using the expressions (2) to (4), the expression (1) is modified to the form described below.

$$Tf2 < Tm \tag{5}$$

Figure 15:
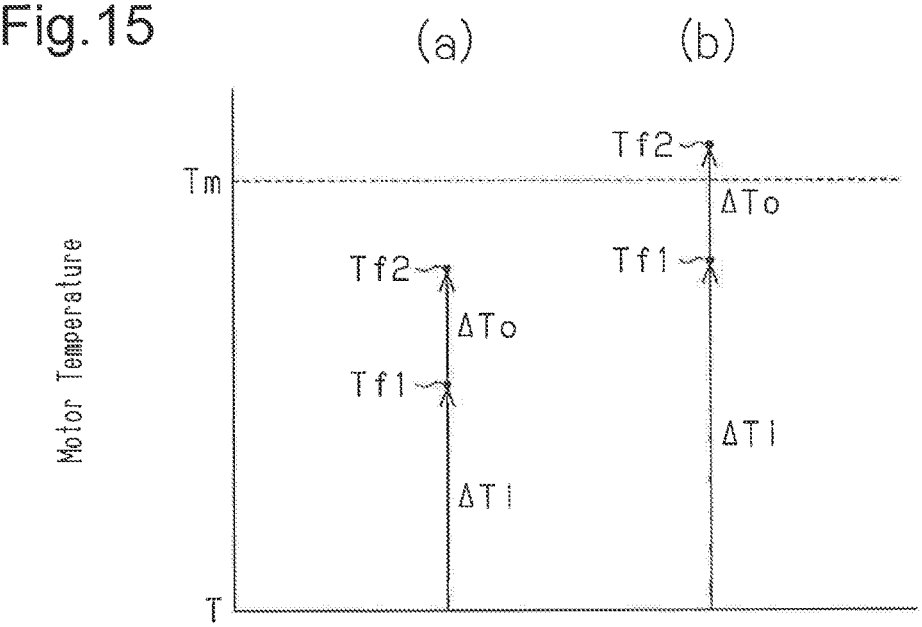
FIG. 15 is a graph representing the relationship among the predicted temperature Tf1, the current temperature T, the temperature increase amount ΔTi, the allowable upper limit Tm, the temperature increase amount ΔTo, and the predicted temperature Tf2.

Section (a) of FIG. 15 corresponds to a case in which the expression (5) is satisfied and represents the relationship among the predicted temperature Tf1, the current temperature T, the temperature increase amount ΔTi, the allowable upper limit Tm, the temperature increase amount ΔTo, and the predicted temperature Tf2. Section (b) of FIG. 15 corresponds to a case in which the expression (5) is not satisfied and represents the relationship among the predicted temperature Tf1, the current temperature T, the temperature increase amount ΔTi, the allowable upper limit Tm, and the temperature increase amount ΔTo.

Figure 16:
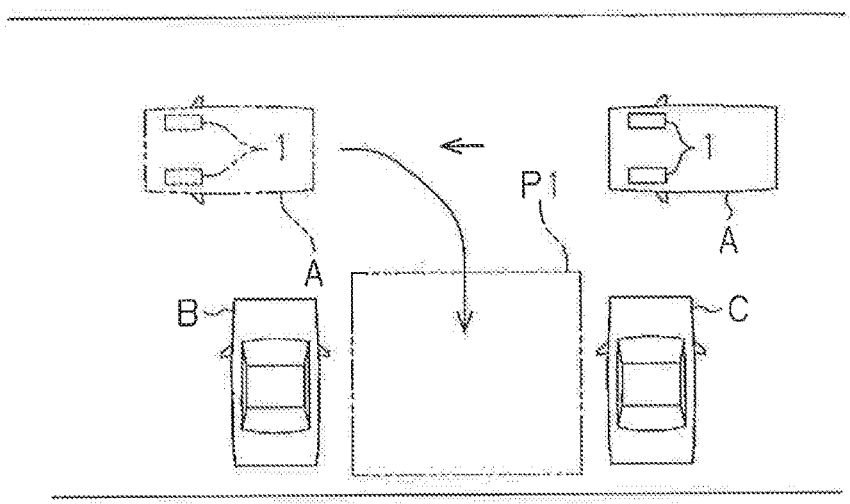
FIG. 16 is a schematic diagram illustrating movement of the host vehicle when the size of a parking area is measured.

As is clear from FIGS. 14 and 16, determination of S111 whether the predicted temperature Tf1 is less than the determination value Th2 corresponds to determination whether the predicted temperature Tf2 is less than the allowable upper limit Tm. A negative determination made in Step S111 indicates that the predicted temperature Tf2 is higher than or equal to the allowable upper limit Tm. In this case, the electronic control unit 9 prohibits the automatic pulling-in control from starting as S112 and then suspends the automatic pulling-in control routine. In contrast, a positive determination made in Step S111 indicates that the predicted temperature Tf2 is less than the allowable upper limit Tm. In this case, the electronic control unit 9 permits the automatic pulling-in control to start as S113 and performs the automatic pulling-in control as S114. The electronic control unit 9 then suspends the automatic pulling-in control routine.

The present embodiment as described above has the following advantages.

(1) When the automatic pulling-in control is started to automatically operate the steering device 2, the procedures (D1) and (D2) are performed through the electronic control unit 9. This increases the execution frequency of the automatic pulling-in control as much as possible while avoiding suspension of the automatic pulling-in or pulling-out control caused by temperature increase of the motor 2a after the automatic pulling-in control is started.

(2) Also, prior to determination whether the predicted temperature Tf2 is less than the allowable upper limit Tm in the procedures (D1) and (D2), the procedure for further increasing the execution frequency of the automatic pulling-in control is performed. That is, based on the current temperature T and the temperature increase amount ΔTi of the motor 2a, the predicted temperature Tf1 of the motor 2a in a case in which the automatic pulling-in control is executed is determined. If the predicted temperature Tf1 is higher than or equal to the determination value Th1, which is lower than the allowable upper limit Tm by the predetermined value A, the automatic pulling-in control is permitted to start. In this case, the automatic pulling-in control is permitted to start not only when the predicted temperature Tf2 is less than the allowable upper limit Tm but also when the predicted temperature Tf1 is less than the determination value Th1, which is lower than the allowable upper limit Tm. This further increases the execution frequency of the automatic pulling-in control.

The above described embodiment may be modified as follows.

The electronic control unit 9 may monitor the operating state of the steering device 2 (the motor 2a) while executing the automatic pulling-in control. When determining that the operating state corresponds to a state in which the temperature of the motor 2a is likely to increase by an amount exceeding the temperature increase amount ΔTi during the execution of the automatic pulling-in control, the electronic control unit 9 may provide a corresponding alarm by means of the display panel 3 or the speaker 4. The display panel 3 and the speaker 4 each function as an alarming section when providing the alarm. The actual operating state of the steering device 2 brought about by the automatic pulling-in control does not necessarily correspond to the operating state with reference to which the temperature increase amount ΔTi is defined, which is the expected operating state. If the actual operating state does not correspond to the expected operating state, the temperature of the steering device 2 (the motor 2a) may increase by an amount exceeding the temperature increase amount ΔTi. However, as has been described, if the operating state of the motor 2a indicates that the temperature of the motor 2a is likely to increase by an amount exceeding the temperature increase amount ΔTi through execution of the automatic pulling-in control, a corresponding alarm is provided through the display panel 3 or the speaker 4. The alarm allows the driver to suspend the automatic pulling-in control and manually pull the host vehicle A into the parking area P1.

Prior to the procedures (D1) and (D2), in which a determination is made as to whether the predicted temperature Tf2 is less than the allowable upper limit Tm, the procedure for increasing the execution frequency of the automatic pulling-in control as much as possible (S106 to S108 of FIG. 11) is performed. However, this procedure does not necessarily have to be performed.

The temperature increase amount of the motor 2a caused by execution of the automatic pulling-in control is influenced by variation in pneumatic pressure of the vehicle wheels or variation in the total weight of the host vehicle A caused by varying numbers of occupants. Information including such variations in the wheel pneumatic pressure and the total weight of the host vehicle A may be input through manipulation of the display panel 3 by the driver and used to calculate the temperature increase amount ΔTi by the electronic control unit 9. In this case, the obtained temperature increase amount ΔTi becomes more accurate.

The temperature increase amounts ΔTi, ΔTo may be calculated using expressions as will be described. That is, the path for pulling the host vehicle A into the parking area P1 is determined. Then, the electric power consumed by the motor 2a for executing the automatic control of the steering device 2 to move the host vehicle A along the determined path and the temperature increase amount (which corresponds to the temperature increase amount ΔTi) of the motor 2a caused by consumption of the electric power are calculated using an expression. Also, the path for pulling the host vehicle A out of the parking area P1 is determined. Then, the electric power consumed by the motor 2a for executing the automatic control of the steering device 2 to move the host vehicle A along the determined path and the temperature increase amount (which corresponds to the temperature increase amount ΔTo) of the motor 2a caused by consumption of the electric power are calculated using an expression.

The automatic pulling-in control is used to pull the host vehicle A into the parking area P1 in a parallel parking, in which the parking area P1 of the host vehicle A is arranged between the other vehicles B and C in the front-rear direction of the host vehicle A. Also, the automatic pulling-out control is used to pull the host vehicle A out of the parking area P1 in the same manner. However, use of the control is not restricted to these cases. For example, the automatic pulling-in control may be used to pull the host vehicle A into the parking area P1 in a perpendicular parking, in which the parking area P1 of the host vehicle A is arranged between the other vehicles B and C in the width direction of the host vehicle A. Also, the automatic pulling-out control may be used to pull the host vehicle A out of the parking area P1 in the same manner.

In this case, when the pulling-in assist is started by the parking assist device, the electronic control unit 9 provides an instruction to the driver to perform the measurement starting operation as preparation for size measurement of the parking area P1 in the manner described below. That is, the driver is instructed to stop the host vehicle A in a front-facing state at the position represented by the solid lines in FIG. 16, which is the position in front of the parking area P1 between the other vehicles B and C at which the host vehicle A is located immediately before reaching the zone corresponding to the parking area P1 after advancing toward the parking area P1. Then, with the host vehicle A stopped at the position, the driver is instructed to release the brake pedal 14 with the shift lever 10 at the drive position. On condition that the driver has accomplished the above-described measurement starting operation, the electronic control unit 9 performs the measurement procedure for measuring the size of the parking area P1. In the measurement procedure, the host vehicle A is moved from the position represented by the solid lines to the position represented by the long dashed double-short dashed lines, which is the position at which the host vehicle A is located immediately after passing the zone beside the parking area P1. While the host vehicle A is moved from the position represented by the solid lines to the position represented by the long dashed double-short dashed lines, the electronic control unit 9 monitors signals from the clearance sonars 5, 7, the ultrasonic sensors 6, 8, the vehicle wheel speed sensor 16, the angle sensor 17, and the yaw rate sensor 19. Then, based on the signals from these sensors, the electronic control unit 9 obtains the size of the parking area P1 and the position of the host vehicle A relative to the parking area P1. Subsequently, the electronic control unit 9 obtains a path for pulling the host vehicle A into the parking area P1 from the position represented by the long dashed double-short dashed lines based on the difference between the size of the parking area P1 and the size of the host vehicle A. The electronic control unit 9 then performs automatic control of the steering device 2 such that the host vehicle A moves along the determined path.

Figure 17:
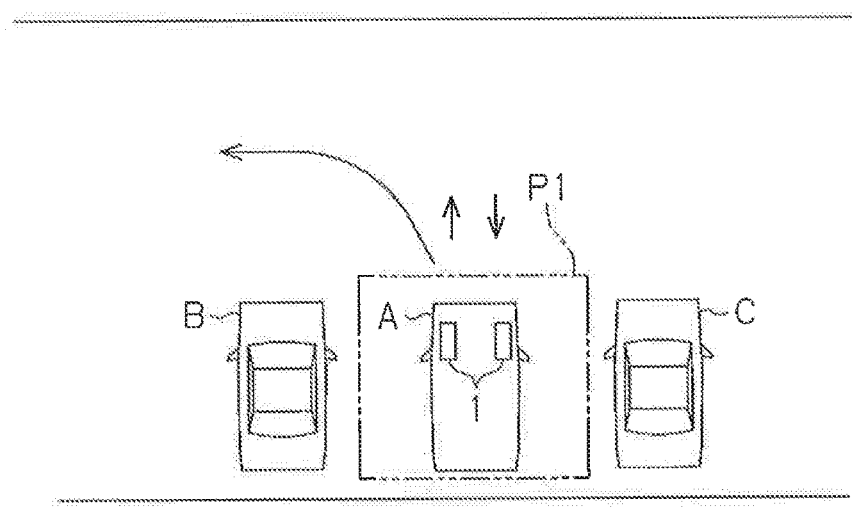
FIG. 17 is a schematic diagram illustrating movement of the host vehicle when the size of a parking area is measured.

When the pulling-out assist is started by the parking assist device, the electronic control unit 9 provides an instruction to the driver to perform the measurement starting operation as preparation for size measurement of the parking area P1 in the manner described below. That is, with the host vehicle A maintained in the parking area P1 as represented by the solid lines in FIG. 17, the driver is instructed to release the brake pedal 14 with the shift lever 10 at the drive position. On condition that the driver has accomplished the above-described measurement starting operation, the electronic control unit 9 performs the measurement procedure for measuring the size of the parking area P1. In the measurement procedure, the host vehicle A is operated to move reciprocally in the front-rear direction in such a range that the host vehicle A does not contact obstacles. Further, when performing the aforementioned reciprocal movement, the electronic control unit 9 monitors signals from the clearance sonars 5, 7, the ultrasonic sensors 6, 8, the vehicle wheel speed sensor 16, the angle sensor 17, and the yaw rate sensor 19. Based on the signals from these sensors, the electronic control unit 9 obtains the size of the parking area P1 and the position of the host vehicle A relative to the parking area P1. Subsequently, based on the difference between the size of the parking area P1 and the size of the host vehicle A, the electronic control unit 9 obtains a path for pulling the host vehicle A out of the parking area P1, in which the host vehicle A is parked. The electronic control unit 9 then performs automatic control of the steering device 2 such that the host vehicle A moves along the determined path.

As the temperature of the steering device 2, the temperature of the ECU for controlling the motor 2a may be employed instead of the temperature of the motor 2a. In this case, the temperature sensor 18 detects the temperature of the ECU.

DESCRIPTION OF THE REFERENCE NUMERALS

1 . . . steerable Wheels, 2 . . . Steering Device, 2a . . . Motor, 3 . . . Display Panel, 4 . . . Speaker, 5 . . . Clearance Sonar, 6 . . . Ultrasonic Sensor, 7 . . . Clearance Sonar, 8 . . . Ultrasonic Sensor, 9 . . . Electronic Control Unit, 10 . . . Shift Lever, 11 . . . Shift Position Sensor, 12 . . . Accelerator Pedal, 13 . . . Accelerator Position Sensor, 14 . . . Brake Pedal, 15 . . . Brake Switch, 16 . . . Vehicle Wheel Speed Sensor, 17 . . . Angle Sensor, 18 . . . Temperature Sensor, 19 . . . Yaw Rate Sensor

The invention claimed is:

1. A parking assist device capable of performing automatic pulling-in control to automatically operate a steering device to assist a vehicle to be pulled into a parking area and automatic pulling-out control to automatically operate the steering device to assist the vehicle to be pulled out of the parking area, the parking assist device comprising:

an electronic control unit configured to
when the automatic pulling-in control is started, calculate a temperature increase amount $\Delta Ti$ of the steering device caused by execution of the automatic pulling-in control and a temperature increase amount $\Delta To$ of the steering device caused by execution of the automatic pulling-out control;
based on a current temperature T of the steering device, the temperature increase amount $\Delta Ti$, and the temperature increase amount $\Delta To$, obtain a predicted temperature $Tf2$ of the steering device of a case in which the automatic pulling-out control is performed subsequent to execution of the automatic pulling-in control;
permit the automatic pulling-in control to start if the predicted temperature $Tf2$ is less than an allowable upper limit $Tm$;
prohibit the automatic pulling-in control from starting if the predicted temperature $Tf2$ is higher than or equal to the allowable upper limit $Tm$; and
execute the automatic pulling-in control if the automatic pulling-in control is permitted to start.

2. The parking assist device according to claim 1, wherein the electronic control unit is configured to
prior to determination whether the predicted temperature $Tf2$ is less than the allowable upper limit $Tm$, obtain a predicted temperature $Tf1$ of a case in which the automatic pulling-in control is performed based on the current temperature T and the temperature increase amount $\Delta Ti$ of the steering device, and
permit the automatic pulling-in control to start if the predicted temperature $Tf1$ is less than a determination value $Th1$, which is lower than the allowable upper limit $Tm$.

3. The parking assist device according to claim 1, wherein the electronic control unit is configured to calculate the temperature increase amount $\Delta Ti$ and the temperature increase amount $\Delta To$ based on the size of the parking area.

4. The parking assist device according to claim 3, wherein the electronic control unit is configured to
calculate the temperature increase amount $\Delta Ti$ based on the difference between the size of the parking area and the size of the vehicle with reference to a first map, and
calculate the temperature increase amount $\Delta To$ based on the difference between the size of the parking area and the size of the vehicle with reference to a second map.

5. The parking assist device according to claim 1, wherein the electronic control unit is configured to
calculate the temperature increase amount $\Delta Ti$ based on a pulling-in path used to assist the vehicle to be pulled into the parking area through the automatic pulling-in control, and
calculate the temperature increase amount $\Delta To$ based on a pulling-out path used to assist the vehicle to be pulled out of the parking area through the automatic pulling-out control.

6. The parking assist device according to claim 1, wherein the electronic control unit is configured to
monitor an operating state of the steering device when performing the automatic pulling-in control, and
provide a corresponding alarm through an alarming section when determining that the operating state of the steering device corresponds to a state in which the temperature of the steering device is likely to increase by an amount exceeding the temperature increase amount $\Delta Ti$ during the execution of the automatic pulling-in control.

7. A parking assist device capable of performing automatic pulling-in control to automatically operate a steering device to assist a vehicle to be pulled into a parking area and automatic puffing-out control to automatically operate the steering device to assist the vehicle to be pulled out of the parking area, the parking assist device comprising:
an electronic control unit configured to
when the automatic pulling-in control is started, calculate a first temperature increase amount of the steering device caused by execution of the automatic pulling-in control and a second temperature increase amount of the steering device caused by execution of the automatic pulling-out control,
based on a current temperature of the steering device, the first temperature increase amount, and the second temperature increase amount, obtain a predicted temperature of the steering device of a case in which the automatic pulling-out control is performed subsequent to execution of the automatic pulling-in control,
permit the automatic pulling-in control to start if the predicted temperature is less than an allowable upper limit,
prohibit the automatic pulling-in control from starting if the predicted temperature is higher than or equal to the allowable upper limit, and
execute the automatic pulling-in control if the automatic pulling-control is permitted to start.

* * * * *